United States Patent

[11] 3,589,226

| [72] | Inventor | Robert L. Shadowens, Jr<br>West Carrollton, Ohio |
|---|---|---|
| [21] | Appl No | 779,526 |
| [22] | Filed | Nov. 27, 1968 |
| [45] | Patented | May 29, 1971 |
| [73] | Assignee | Dayton Progress Corporation<br>Dayton, Ohio |

[54] PUNCH ASSEMBLY
7 Claims, 5 Drawing Figs.

[52] U.S. Cl. ............................................. 83/143,
83/698, 267/180, 279/76
[51] Int. Cl. .............................................. B26f 1/14
[50] Field of Search ................................... 83/698,
140; 279/76; 287/86, 127, 267/180

[56] References Cited
UNITED STATES PATENTS
2,001,835  5/1935  Cook ..................... 29/451 UX

| 2,424,145 | 7/1947 | Butler | 267/180 X |
| 3,106,120 | 10/1963 | Reece | 83/140 X |
| 3,253,827 | 5/1966 | Mills | 267/180 X |
| 3,459,081 | 8/1969 | Kanode | 83/698 X |

*Primary Examiner*—James M. Meister
*Attorney*—Jerome P Bloom

ABSTRACT: A punch, punch retainer or like assembly characterized by a uniquely applied retainer element in the form of a coiled compression spring installed in a bore to apply a spring load to a component part. The spring has a differential diameter and is differentially wound. When inserted in a bore, a portion of the spring contacts the bore wall with an expanding pressure to per se yieldingly anchor the spring in place A spring portion lends itself to a simple winding to facilitate introduction and removal of the spring. In certain applications the spring is permitted a self-adjusting action under the influence of impact and vibration forces.

PATENTED JUN29 1971
3,589,226
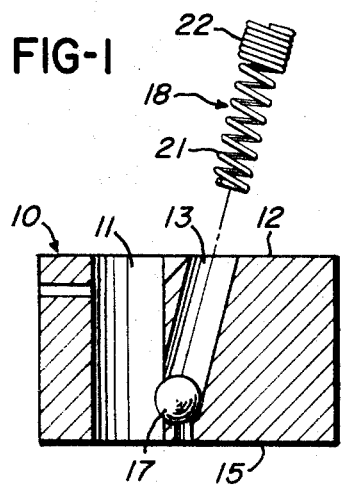
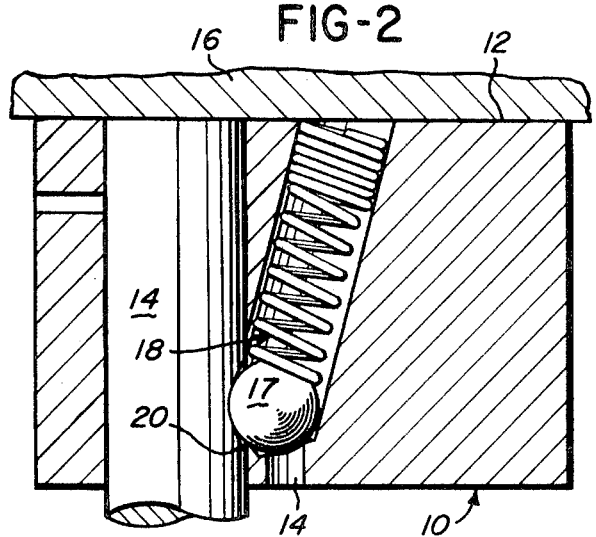
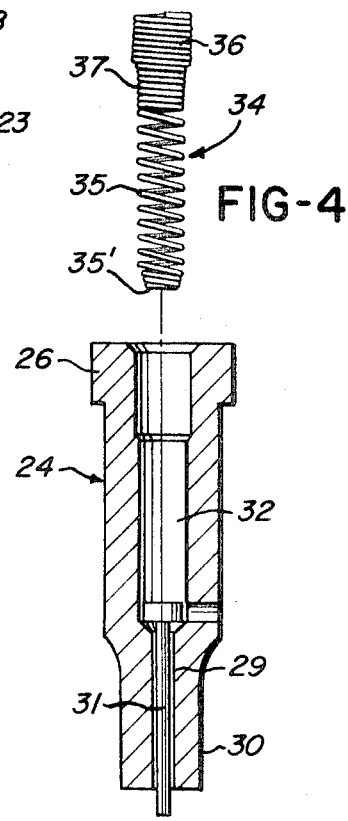
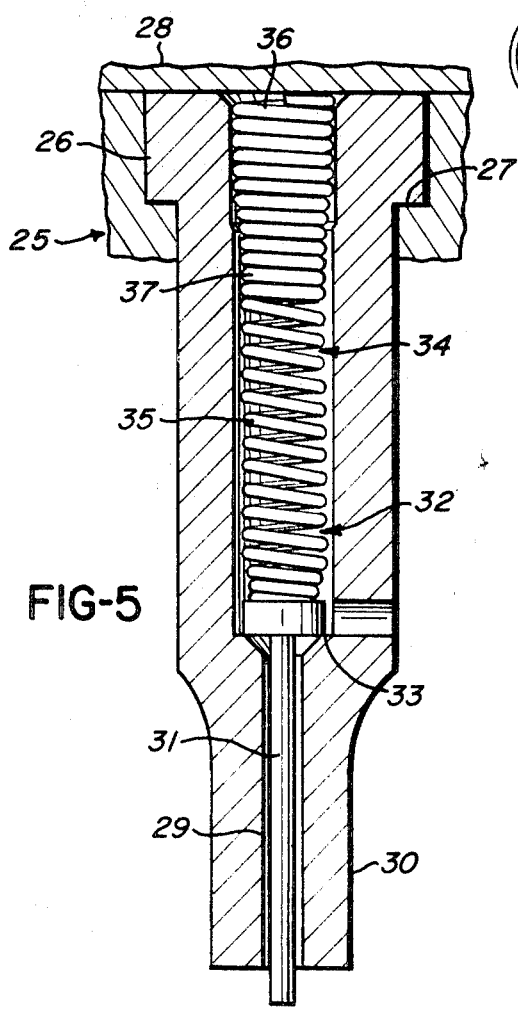
INVENTOR
ROBERT L. SHADOWENS JR.
BY Jerome P. Bloom
ATTORNEY

PUNCH ASSEMBLY

This invention has particular advantages in relation to piercing punch and related assemblies and will be so described for purposes of illustration, though its application is obviously not so limited. More particularly, the invention provides a generally new means and method for anchoring component parts by spring loading.

It has been known in the past to spring load component parts of punch assemblies. Examples of such components are the ejector pin for removing adhering blanks from a punch face or the ball used for retaining a punch element within its mounting body. In such assemblies the loading spring is fully contained within its accommodating bore in order that a backup plate means may be intimately applied to contact the head end of the punch assembly for reactant purposes. In the prior art there is conventionally inserted in the spring bore a plug element such as a headless screw which is used for spring retention. Another method employed for providing spring retention is to drill a hole radially of the outer end of the spring bore and form the outermost end of the spring as a radial projection for insertion in this radially drilled hole. Both of these and other practiced means and methods for spring retention may yield satisfactory results. However, they are not always satisfactory since they present difficulties in the assembly and disassembly of springs. There is, moreover, an inherent and frequent loss of springs in the assembly and disassembly of punch assemblies. This is a handling problem. Of course, these factors add cost to the punch assemblies and their use. Moreover, when plugs are used, this requires tapping the end of the spring bore and careful fitting of the plug. When the special radial hole is required, this introduces an added cost factor and the assembly process requires that the spring must be carefully manipulated to insert its terminal end in the hole. This is difficult without damage to the spring. Further, in use of the latter concept there is a prevalence of spring fatigue and breakage, necessitating frequent replacement.

The present invention obviates the above problems. It provides an improved and more economical punch assembly which embodies a simply improved loading spring means offering advantages of simplified installation and removal. The invention reduces or eliminates the need for consideration of special retention means of the nature provided in the prior art.

In a preferred embodiment of the invention, the loading spring means consists of a coiled compression spring having coil segments of respectively different diameter and differentially wound. A smaller diameter portion of the spring is wound for ready deflection and relative freedom of extending and retracting motions. A larger diameter portion provides a segment formed with tighter coils to be received in a spring bore in a contracted condition and with a press fit so that coils thereof will expand against the bore wall in a manner to per se anchor the spring within its bore. The invention spring is inserted in a spring bore with the smallest diameter segment being the leading segment and forwardly compressed in the process of the largest diameter segment or segments of the spring being thrust into the spring bore. Insertion of the spring may be facilitated by a simple twisting of the larger diameter portion of the spring to reduce its diameter to less than that of the bore. On release the spring will self-lock in a manner that the assembly may be handled without fear of spring loss. Removal of the spring is accomplished in a similar manner, that is by winding or twisting the wider end of the spring on itself to nullify its friction lock with the bore wall. When this is done, the spring obviously may be readily withdrawn. These and other features of the invention and its application will become more obvious from the following.

It is a primary object of the invention to provide a punch installation which is more economical to fabricate, more efficient and satisfactory in use and easier to service and maintain.

Another object of the invention is to provide a punch assembly offering a simplified means and method for installing and removing loading springs.

A further object of the invention is to provide a self-locking loading spring having particularly advantageous use in a punch or like assembly.

Another object of the invention is to provide a punch installation wherein the punch unit is provided with self-locking loading springs and the latter are endowed with a capability of self-adjusting to a particularly designed or required length to optimally accommodate forces attendant the operation of the punch.

A further object of the invention is to provide in a punch or like assembly loading elements of spring form, use of which substantially eliminates the incidence of spring loss.

An additional object of the invention is to provide a punch or like assembly embodying self-locking loading springs possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein are shown some but not necessarily all the forms of embodiment of the present invention, FIG. 1 is a schematic illustration of a longitudinal section of a part of a punch installation showing the body of a punch retainer with the invention spring means in an exploded relation to its bore;

FIG. 2 is a view similar to FIG. 1, on an enlarged scale, showing the parts of FIG. 1 assembled to a punch and a backup plate;

FIG. 3 is a top end view of the spring means of FIGS. 1 and 2;

FIG. 4 is a schematic exploded view showing an ejector-type punch assembly accommodating a loading spring similar to that shown in FIGS. 1—3, the spring applying a resilient load to an ejector pin; and FIG. 5 schematically shows the device of FIG. 4 on an enlarged scale and in an assembled, installed position.

Like parts are indicated by similar characters of reference throughout the several views.

Referring to the drawings, FIGS. 1 and 2 show a punch retainer unit which forms part of a punch installation. The retainer body 10 there illustrated is provided with a vertical opening forming a bore 11. At what may be considered its upper end, the body 10 has a flat planar surface 12. At its lower end the body has a surface 15 which is parallel to the surface 12. Opening at one end through the surface 12 is a second bore 13. The latter has its innermost end open at one side thereof to the bore 11. It is so oriented that if extended the axis of the bore 13 would intersect the axis of the bore 11.

As seen in FIG. 2 of the drawings, bore 11 accommodates the shank of a piercing punch element 14 which projects through and beyond the surface 15 to have its operating end positioned adjacent a workpiece. In assembly the uppermost or head end of the punch disposes in a substantially flush relation with the surface 12 and on mounting the unit so provided commonly abuts a backup plate 16. As the punch is conventionally operated, it is successively advanced to and retracted from workpieces. In the process the punch element performs its intended cutting, perforating or like functions, the reactant force of the working action, as transmitted through the punch per se, being applied to the backup plate and the punch retention means.

For punch retention the shank of the punch 14 is provided in the side thereof with a groove forming an arcuate, recessed surface 20. In assembly of the punch, the surface 20 is positioned opposite the opening from the lower end of the bore 13. Seated in the lower end of bore 13 is a ball element 17 a portion of which projects through the opening from the bore 13 to the bore 11 and engages in and to the recessed surface 20 of the punch. The bore 13 further receives a coiled compression spring 18 which loads the ball 17 to secure the punch in place.

Referring more particularly to the coiled compression spring 18, it will be obvious that it is introduced into the bore 13 through the surface 12 prior to the assembly of the body 10 and the contained punch to the backup plate 16. With respect to the manner of its introduction, it may be considered to have a leading end portion 21 and a trailing end portion 22. End portion 21 engages the ball 17 and may be considered its working end. As may be seen with reference to FIGS. 1 and 2 of the drawings, the respective end portions 21 and 22 of the spring 18 are differentially formed spring segments. The coil segment 21 has a smaller diameter than the coil segment 22. Moreover, the coils of segment 21 are wound in such spaced relation as to enable relatively free compression and extension thereof in applying continuous endwise thrust to the ball 17. In contrast, the spring segment 22 which has a larger diameter also has a more compacted form, the coils thereof being closely wound. The diameter of the coil segment 21 is such to be received relatively freely within the bore 13, the wall of the bore imposing no substantial restriction or achieving no frictional contact therewith which would resist extending and compressing movements of the spring as required. The diameter of the segment 22, on the other hand, is made to somewhat exceed the diameter of the bore 13. This enables the trailing end of the spring to be utilized as a self-locking or anchoring means for the spring which ensures its retention in the bore 13 and under conditions where the ball 17 is properly loaded to serve its retention function in respect to the punch 14.

Accordingly, it will be seen that the spring 18 may be easily thrust interiorly of the bore 13, the leading extremity engaging the ball 17 and the segment 21 compressing as the segment 22 is thrust interiorly of the bore to achieve its self-locking function. Referring to FIG. 3 of the drawings, it may be seen that the trailing extremity 23 of the spring 18 may be bent inwardly to assume a radial orientation in respect to the spring coils and terminate on the axis of the spring. Through the medium of the portion 23, it will be obvious that as the spring is inserted and engaged to the ball 17 the spring may be twisted on itself and contracted to facilitate a smooth and easy insertion of the spring. Once the spring is released, the closely wound coils of the trailing segment 22 freely expand and have their outer peripheral surfaces lock in engagement with the bore wall in a manner believed obvious. In the process of thrusting the spring inwardly of the bore 13 the segment 21 is loaded as previously described and energy is stored thereby. In the process of the punch operation, shock and vibration transmitted through the punch shank to the ball 17 is accommodated in the spring segment 21.

It will be seen that the described apparatus is particularly advantageous in the environment set forth. Not only must the spring load be applied to the ball 17 in the assembly procedure but the spring must be so retained that the assembly can be easily handled in applying it to the required backup plate, schematically shown and designated as 16 in this instance. As contrasted to the prior art devices for loading the ball 17, in the present instance there needs to be no special plug nor manipulation of a spring under pressure in efforts to apply a plug. Moreover, there need be no projections on a spring which might weaken and fatigue during punch operation and thereby necessitate a replacement of the spring. Further, there is no need to drill holes in the wall of the bore 13. The assembly is simply and easily achieved on thrust of the spring 18 into the bore 13. There need be no concern of any spring loss in handling due to the self-locking function of the spring and there needs to be no concern about spring loss of difficulties deriving therefrom during the procedure of applying the punch assembly to its backup means.

Another embodiment of the invention is shown in FIGS. 4 and 5 of the drawings. Here a modification of the invention embodiment is utilized in an ejector-type punch. As shown, there is a hollow punch body 24 having at its upper end an external flange 26 and at its lower end a formed cutting extremity 30. The extremity 30 is provided with a small central bore 29 terminating at its upper limit in a relatively expanded counterbore 32, there being a shoulder formed in the process which defines a plane of demarcation between the bore 29 and counterbore 32. This shoulder 33 seats the expanded head of an ejector pin 31, the body of which projects through the bore 29 and from the operating face of the punch 24. Note is to be taken of the fact that the uppermost end of the wall defining the bore 32 is slightly expanded in this case. Accommodated in the bore 32 in spring-loading effect to the ejector pin 31 is a spring 34. The spring 34 embodies the concept of the spring 18 but in this case has a greater number of differentiated segments.

Considering the spring 34 in detail, it has a leading end segment 35 the coils of which are relatively loosely wound and of a common diameter except for its working extremity 35' which is relatively tightly wound and further reduced in diameter in somewhat conical fashion. The segment 35 in the normally extended condition of the spring has a length somewhat greater than half of the spring length. Immediately above the segment 35, referring to FIG. 4, the coils of the spring are relatively tightly wound though their diameter is not appreciably greater than the diameter of the main extended portion of the segment 35. The spring 34 has its trailing or uppermost segment 36 tightly wound in a form to make this segment have the largest diameter of the spring. Attention is directed to the fact that the diameter of the trailing segment 36 is somewhat larger than the diameter of the counterbore 32 at its relatively expanded uppermost extremity.

As is believed obvious, the spring 34 may be installed in the bore 32 in the same manner as the spring 18 is installed in the bore 13 in the first-described embodiment of the invention. As a spring 34 is inserted in the bore 32, its leading extremity and segments 35 and 37 are received free of the bore wall and to abut and load the ejector pin 31 through the medium of its expanded head. Pressure may be applied to the trailing end of the spring to thrust it interiorly of the bore 32. In this process, a portion on the spring trailing extremity comparable to the portion 23 of the spring 18 may be utilized to wind the spring on itself and contract the portion of largest diameter sufficiently to facilitate the easy insertion of the spring. On release of the spring, the coils thereof of largest diameter in the segment 36 achieve a pressured engagement to the wall of the bore and a self-locking of the spring in place. The net result is a precise but firm loading of the head of the ejector pin to cause it to seat to the shoulder 33 and ensure its operative function in the conventional manner. Once the spring is installed in the simple manner, there need be not further plug or other retention means provided. The punch assembly ma thus be handled by any unskilled personnel, applied to its backup plate 28, as required in installation, and contained thereto through the medium of the releasable plate 25 portions of which overlap the flange 26 on the punch body. Plate 25 is secured to the backup plate in a conventional manner.

Thus, it should be well apparent at this point that there is substantial advantage in embodiment of the invention in punch assemblies and installations of the type described. There is no fumbling with springs with dangers of loss due to difficulties in handling. There is no need for springs to be held in place in awkward fashion prior to lock thereof through various other means. Once a spring is inserted, then the punch assembly may be handled without fear and concern for loss of the spring and this simplifies the completion of a punch installation. This is the essence and capability of the invention in its preferred embodiments described.

While the invention spring is self-locking and is so designed to self-fix in place and under predetermined conditions of load, there may be applications where it is desired that the loading spring achieve its desired operating length subsequent to assembly of a punch unit or punch retainer to a conventional ram or backup plate. In such instance, the dimension of the segment of the spring of largest diameter will be made such to permit under predetermined vibration and impact conditions the self-adjustment or creeping adjustment of this segment to elongate the operating length of the spring. Under such circumstances the objective will be to ensure the easy installation of the spring in its base unit so that the unit may be handled without concern until its installation, as previously described. Then, when installed in a fixed relation to the operating components and the punch commences heavy-duty operation, the spring will as a result adjust to the designed length in the process and thereby prevent early deterioration and fatigue of the spring and maintain its desired loading capacity while giving the leading segment thereof greater freedom of extending the attracting motions. The advantages thereof are believed obvious.

While not necessary or required, variations on the proposed locking engagement are possible. For example, a spiral or annular groove may be rolled or otherwise formed in the wall of the bore 13 to receive one or more closed coils of the retainer spring which will be appropriately dimensioned for the locking function. Further, it may be desired for certain applications that the wall of the bore adjacent its upper or trailing end may be roughened to increase the interlock with the self-locking spring coils. Still further, a bell mouth may be used in the bore. However, these are mere variations and are not intended to be equated with the preferred and basic embodiment with the invention. Of course, the relative number of segments of different diameter which are utilized in any particular self-locking loading spring will depend on the particular application. There may also be less or greater number of turns in the segment of locking coils and their spacing might vary without departing from the basic inventive concept.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

I claim:

1. In a punch, punch retainer or like assembly a body portion of which has a bore therein to receive retention means, a loading device for application in said bore comprising a coiled compression-type spring having leading and trailing end portions with respect to its manner of introduction into said bore, the leading end portion having a working functions to apply a spring load to a component of the punch assembly, characterized by said spring having segments thereof which are differentially formed, at least one segment having a diameter which is oversize relative to that of said bore whereby on application of the spring to said bore, said oversize segment will be contracted and the coil or coils thereof will automatically press radially outward against the wall of the bore to per se frictionally anchor the spring without need for further retention means, the trailing end portion of said spring terminating in an inwardly directed terminal portion providing means for winding said spring on itself in the process of insertion in said bore whereby to contract said oversize spring segment to facilitate insertion of the spring in said bore.

2. In a punch, punch retainer or like assembly a body portion of which has a bore therein to receive retention means or other components of the assembly, a loading device for application in said bore comprising a coiled compression-type spring having leading and trailing end portions with respect to its manner of introduction into said bore, the leading end portion having a working function to apply a spring load to a component of the punch assembly, characterized by said spring having segments thereof which are differentially formed, at least one segment having a diameter which is oversize relative to that of said bore whereby on application of the spring to said bore, said oversize segment will be contracted and the coil or coils thereof will automatically press radially outward against the wall of the bore to per se frictionally anchor the spring without need for further retention means, the spring coils at the trailing end portion thereof providing integrally formed projecting means for winding the spring on itself to contract said oversize segment and facilitate the insertion of the spring in said bore, the release of the spring when inserted in said bore producing an automatic self-locking reaction of said oversize segment.

3. Apparatus as in claim 2 characterized by said spring segment of oversize diameter being formed of compacted tightly wound coils and the said leading end portion of said spring including coils arranged in spaced relation to enable their relatively free compression and extension in applying endwise thrust to said component of the assembly.

4. Apparatus as in claim 3 characterized by said oversize spring segment and said leading portion being at opposite ends of said spring and the working extremity of said leading portion being tightly wound to a reduced diameter, there being a further tightly wound segment intermediate said oversize spring segment and said leading portion.

5. In a punch, punch retainer or like assembly, a body portion of which has a bore therein to receive retention means or other components of the assembly, a loading device for application in said bore comprising a coiled compression-type spring having leading and trailing end portions with respect to its manner of introduction into said bore, the leading end portion having a working function to apply a spring load to a component of the punch assembly, characterized in that said spring is formed over a major part of its length with readily deflectable, relatively widely spaced coils having a diameter equal to or slightly less than the bore diameter, said trailing end portion thereof comprising a less readily deflectable portion of more closely spaced coils and being of substantial length for the achieving of a relatively long bearing in said bore, said trailing end being connected to said widely spaced coils by another like portion of approximately the same diameter as said widely spaced coils.

6. In a punch or like assembly, a body having a bore, an outer planar surface on said body through which one end of said bore opens, a punch component in said bore at least a portion of which is disposed to seat to said body inwardly from said one end of said bore, a coiled compression spring introduced endwise into said bore through said one end thereof, said spring having leading and trailing end portions with respect to its manner of introduction into said bore, said spring having a designed length such that in a seated position of said punch component in said bore the leading end portion of the spring contacts said component while the trailing end extends to at least said one end of said bore, said trailing end portion of said spring being oversize in diameter relative to the leading end portion and to the bore diameter to a degree that when received in the bore it inherently expands to a frictional lock with the bore wall sufficient to maintain the spring in an assembled relation, said bore wall and oversize spring portion being formed and operatively related to provide that said spring will self-adjust on working of said punch component and react against backing plate means seating against said outer planar surface of said body in closing relation to said one end of said bore, whereby said spring, despite being compressed in assembly to less than its designed length, is in use self-adjusting to its designed length, the spring coils at said trailing end portion of said spring being formed to be susceptible of winding to reduce the diameter of the spring at said trailing end portion, facilitating insertion and removal of the spring relative to the bore, said trailing end portion including integrally formed means accessible through the open end of said bore to apply a winding torque to said spring.

7. A punch assembly according to claim 6, characterized in that said spring is formed over a major part of its length with readily deflectable relatively widely spaced coils having a diameter equal to or slightly less than the bore diameter, said trailing end portion thereof comprising a less readily deflectable portion of more closely spaced coils and being of substantial length for the achieving of a relatively long bearing in said bore.